US009505357B2

(12) United States Patent
Ksiezopolski

(10) Patent No.: US 9,505,357 B2
(45) Date of Patent: Nov. 29, 2016

(54) COMBINATION SPLASH SEAL AND WEAR BAR

(71) Applicant: Lifetime Industries, Inc., Elkhart, IN (US)

(72) Inventor: Edwin E Ksiezopolski, Granger, IN (US)

(73) Assignee: Lifetime Industries, Inc., Modesto, CA (US)

( * ) Notice: Subject to any disclaimer, the term of this patent is extended or adjusted under 35 U.S.C. 154(b) by 168 days.

(21) Appl. No.: 14/563,146

(22) Filed: Dec. 8, 2014

(65) Prior Publication Data
US 2015/0158438 A1 Jun. 11, 2015

Related U.S. Application Data

(60) Provisional application No. 61/912,687, filed on Dec. 6, 2013.

(51) Int. Cl.
*B60R 13/06* (2006.01)
*F16J 15/02* (2006.01)
*B60P 3/34* (2006.01)

(52) U.S. Cl.
CPC .............. *B60R 13/06* (2013.01); *B60P 3/34* (2013.01); *F16J 15/022* (2013.01); *B60J 10/24* (2016.02); *F16J 15/027* (2013.01)

(58) Field of Classification Search
CPC .......... B60P 3/34; B60P 3/341; B60R 13/06; B60J 10/24; B60J 10/246; F16J 15/022; F16J 15/025; F16J 15/027
See application file for complete search history.

(56) References Cited

U.S. PATENT DOCUMENTS 4,448,430 A * 5/1984 Bright ...................... B60J 10/84
                                                              277/642
5,226,277 A * 7/1993 Beckmann ............... B60J 10/80
                                                              24/31 C (Continued)

*Primary Examiner* — Vishal Patel
*Assistant Examiner* — Nicholas L Foster
(74) *Attorney, Agent, or Firm* — Botkin & Hall, LLP

(57) ABSTRACT

A seal assembly is mounted to a floor portion of an RV with a slide out room. The slide out room has a wall and a floor that is separated from the floor of the RV. The seal assembly has a wear bar having an arcuate top and a wiper that seals to the slide out room floor. The seal assembly includes a splash shield with a resilient end that seals to the wall of the slide out room.

18 Claims, 4 Drawing Sheets

(56) References Cited

U.S. PATENT DOCUMENTS

| | | | | |
|---|---|---|---|---|
| 6,966,590 B1* | 11/2005 | Ksiezopolki | ............. | B60P 3/34 296/165 |
| 7,380,854 B1* | 6/2008 | Hanser | ...................... | B60P 3/34 296/26.12 |
| 7,540,116 B1* | 6/2009 | Martinson | ................. | B60P 3/34 277/644 |
| 7,651,144 B2* | 1/2010 | Clark | ....................... | B60P 3/34 277/644 |
| 8,408,625 B1* | 4/2013 | Ksiezopolski | ............ | B60P 3/34 296/171 |
| 8,910,422 B2* | 12/2014 | Siegel | ...................... | B60P 3/32 277/649 |
| 9,033,390 B1* | 5/2015 | Ksiezopolski | .......... | B60R 13/06 296/26.13 |
| D741,231 S * | 10/2015 | Schoonover | ................. | D12/106 |
| 2002/0089213 A1* | 7/2002 | Gehman | .................. | B60P 3/34 296/171 |
| 2006/0091687 A1* | 5/2006 | Schoffner | ................. | B60P 3/34 296/26.01 |
| 2008/0048464 A1* | 2/2008 | Ksiezopolski | ............ | B60P 3/34 296/26.01 |
| 2008/0073925 A1* | 3/2008 | Ksiezopolski | ............ | B60P 3/34 296/26.01 |
| 2012/0079771 A1* | 4/2012 | Meulemans | .......... | E06B 7/2305 49/484.1 |
| 2013/0269262 A1* | 10/2013 | Siegel | .................... | B60R 13/08 49/492.1 |
| 2014/0001710 A1* | 1/2014 | Siegel | .................... | B60R 13/06 277/630 |
| 2014/0097578 A1* | 4/2014 | Young | .................... | F16J 15/027 277/628 |
| 2014/0203522 A1* | 7/2014 | Ksiezopolski | ......... | F16J 15/027 277/634 |
| 2015/0260287 A1* | 9/2015 | Young | .................... | F16J 15/027 277/312 |
| 2016/0003358 A1* | 1/2016 | Young | .................... | F16J 15/027 277/645 |
| 2016/0159294 A1* | 6/2016 | Ksiezopolski | ......... | B60R 13/06 277/637 |

* cited by examiner

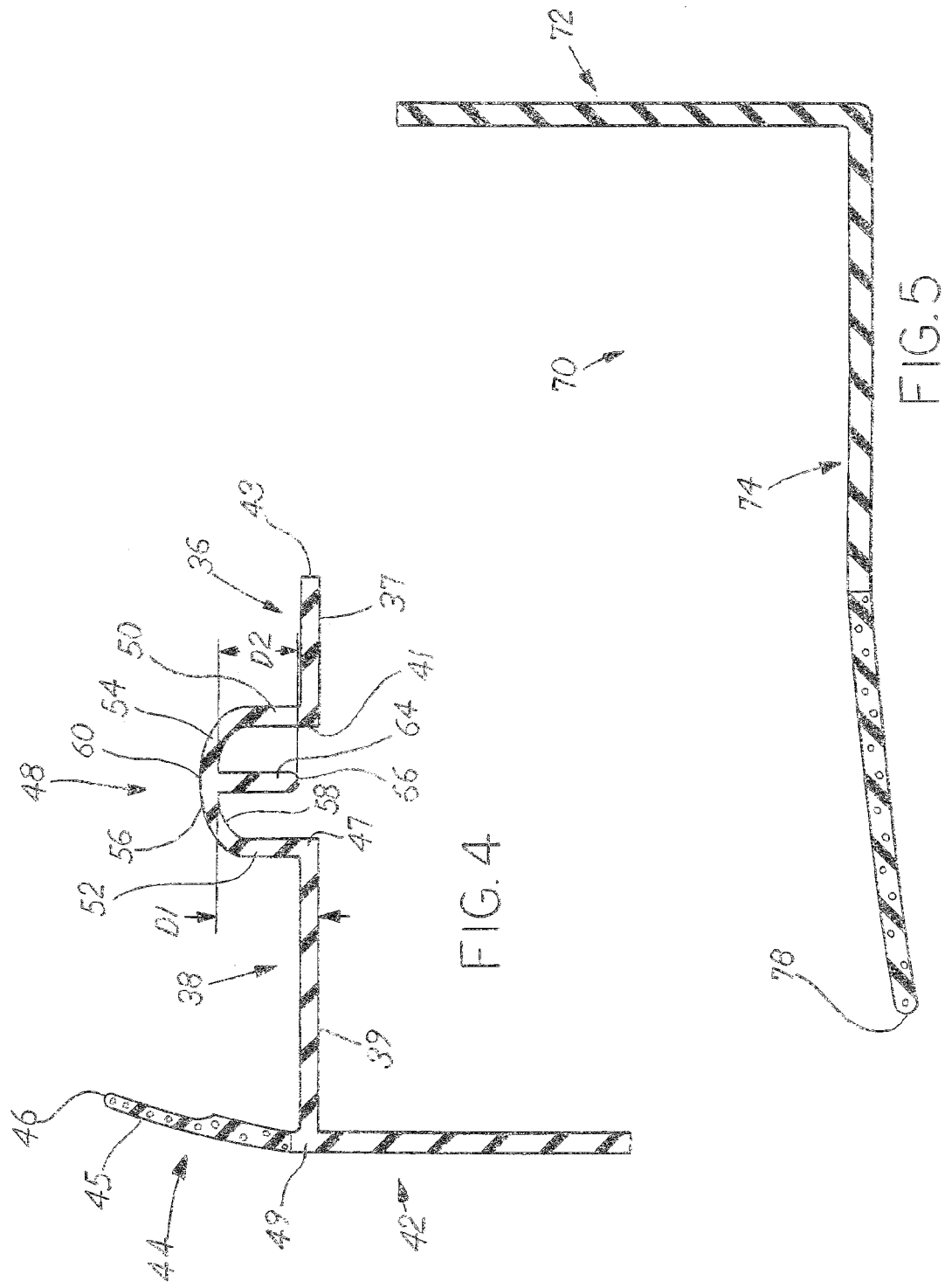

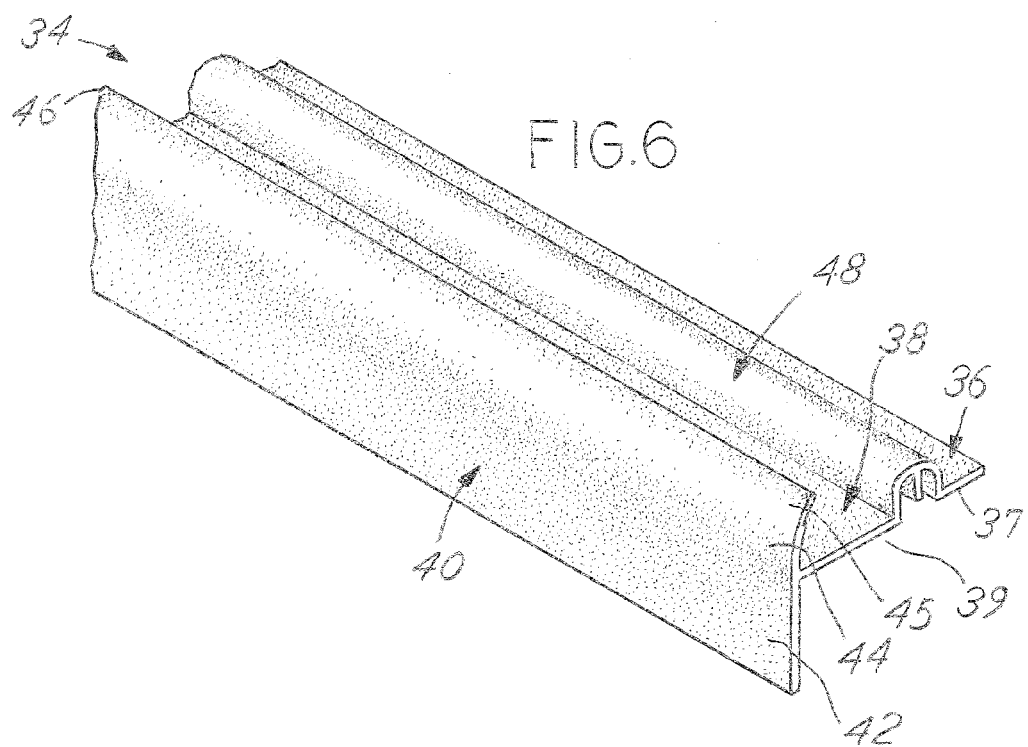
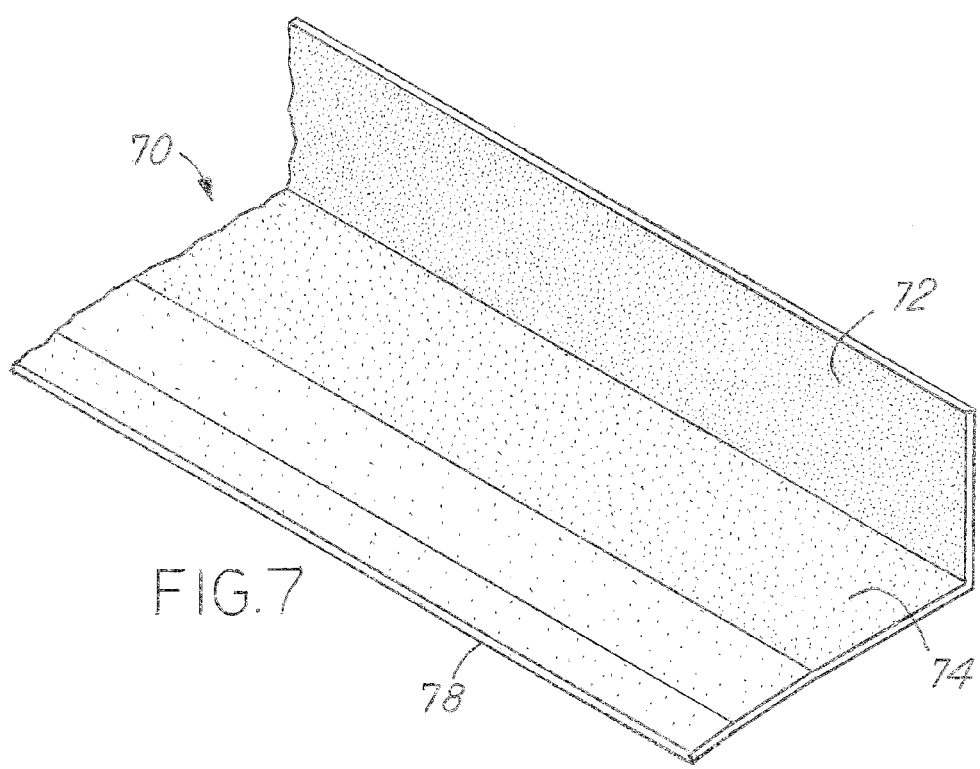

COMBINATION SPLASH SEAL AND WEAR BAR

CROSS REFERENCE TO RELATED APPLICATIONS

This application claims the benefit of U.S. Provisional Application No. 61/912,687, filed Dec. 6, 2013, the disclosures of which are hereby incorporated by reference.

BACKGROUND OF THE INVENTION

Slide out rooms are commonly used to expand the usable space within a recreational vehicle ("RV"). It is important that the slide out room be sealed from the exterior of the vehicle. Inadequately sealed slide out rooms create a perception in an end user's mind that the vehicle is low quality. Gaps between parts of the slide out room and the RV create opportunity for drafts, rodents, insects, water, debris, or other undesirable elements to enter the interior of the RV. Evidence of an inadequately sealed slide out room may be light showing around where the slide out room interfaces with main RV interior, drafts around the slide out room, or water entering the RV from around the slide out room.

It is particularly difficult to effectively seal the lower portion of a slide out room. There is ample opportunity for seals near this area of the slide out room to be breached by light, air, or water. Water may be thrown up into the room during travel along roads. There is a need to prevent water from being splashed or thrown into the slide out room from below during travel.

SUMMARY OF THE INVENTION

The present disclosure describes a seal assembly that is made up of two pieces. The first piece is designed to seal the floor of the existing RV to the floor of the slide out room with an upper portion where a resilient wiper slides along the bottom of the slide out room floor. The first piece includes a wear bar made from a higher durometer that also slides along the floor. The second piece is designed to seal the floor of the RV to the side wall of the slide out room by having a sealing leg that mates to the side wall when the slide out room is in the retracted position.

BRIEF DESCRIPTION OF THE DRAWINGS

A preferred embodiment of this invention has been chosen wherein:

FIG. 4 is a side view of the floor portion of the seal show in FIG. 3;

FIG. 5 is a side view of the splash portion of the seal shown in FIG. 3;

FIG. 6 is a perspective view of the floor portion of the seal shown in FIG. 4; and FIG. 7 is a perspective view of the splash portion of the seal shown in FIG. 5.

DESCRIPTION OF THE PREFERRED EMBODIMENT

Figure 1:
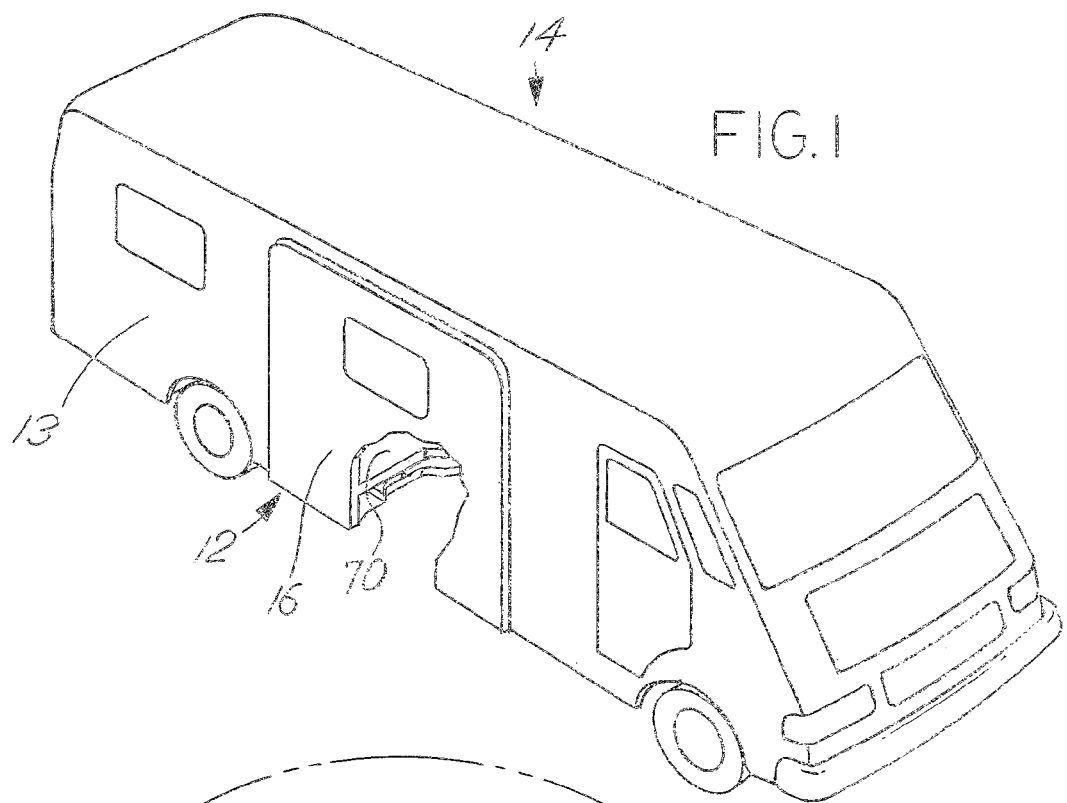
FIG. 1 is a perspective view of an RV having a slide out room.
Figure 2:
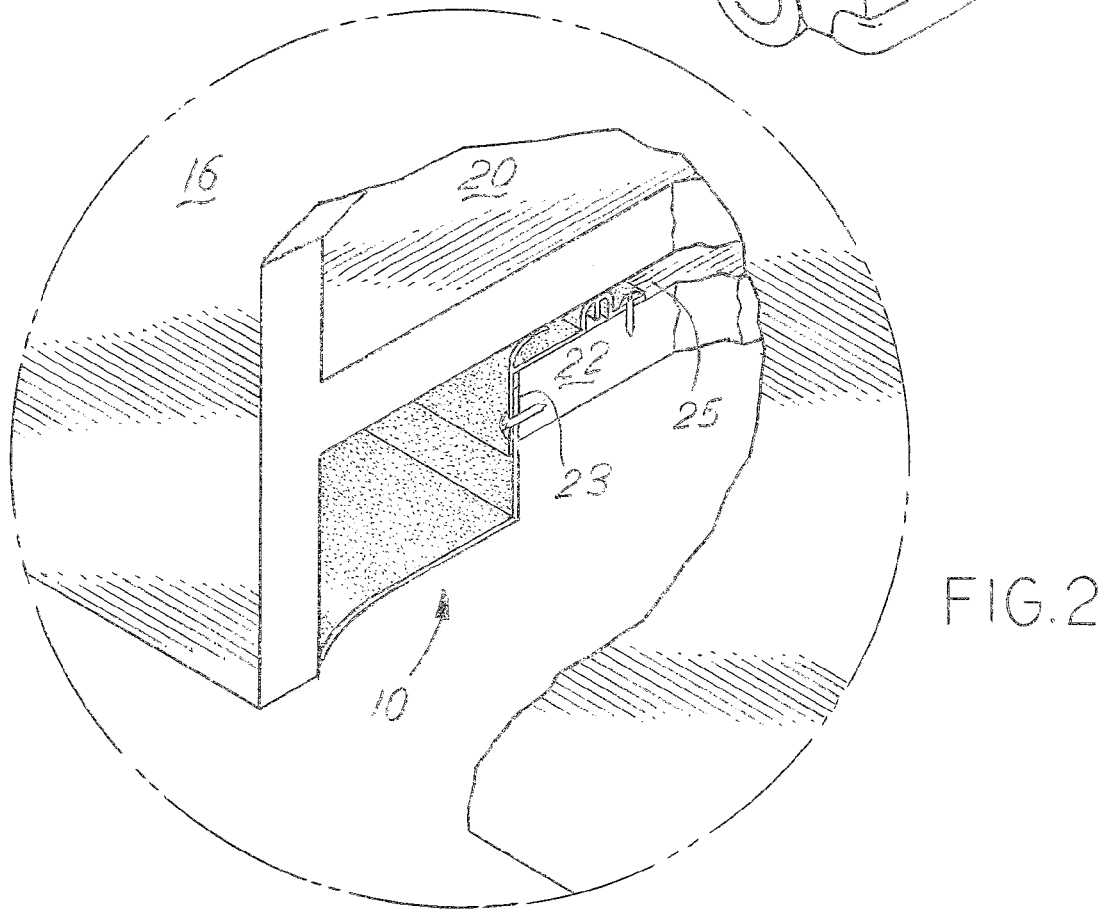
FIG. 2 is a magnified view taken about area 2 in FIG. 1

The present invention is a seal 10 useful for sealing beneath a slide out room 12 in a recreational vehicle ("RV") 14. The slide out room 12 is slidably retained in an opening in sidewall 13 of the RV. The slide out room 12 has an end wall 16 that faces the exterior of the RV and overlaps the sidewall 13 of the RV 14. The end wall 16 is shown in FIG. 2. The end wall 16 is attached to a slide out room floor 20 that slides over a main floor 22 that serves as the floor of the recreational vehicle. The main floor 22 has an outermost edge 23 that defines the outermost portion of the floor 20. The end wall 16 is also connected to slide out room sidewalls and a roof (that are not shown) to form the slide out room 12. The slide out room 12 is slidable from a retracted position as shown in FIGS. 1 and 2 to an extended position that places the end wall 16 at a distance further spaced from the sidewall 13 of the recreational vehicle. The extended position is not shown.

The slide room floor 20 is spaced from the main floor 22 as it slides over the main floor 22 to shift between the extended and retracted positions. FIGS. 2 and 4 show the space 25 between the main floor 22 and the slide out room floor 20. The seal 10 of the present invention is located at least partially in this space 25.

FIG. 4 shows a floor portion 34 of the seal 10 that is mounted to the main floor 22. The floor portion has an inward flange 36 and an outward flange 38 that are integral and continues with an exterior leg 40. The inward flange 36 has a lower surface 37 that is coplanar with a lower surface 39 on the outward flange 38. Both of the flanges 36, 38 are collinear with each other and the lower surfaces 37, 39 are coplanar. Flange 36 has a first terminal end 41 and a second terminal end 43. Flange 38 has a first terminal end 47 and a second terminal end 49. The exterior leg 40, which is attached to the second terminal end 49 of the outward flange 38, has a lower portion 42 that is adapted for locating the floor portion 34 along the outermost edge 23 of the main floor 22. The lower portion 42 is made of a relatively high durometer elastomeric material and is the same material as the inward and outward flanges 36, 38. An upper portion 44 of the exterior leg 40 extends upwardly and opposite to the lower portion 42. The upper portion 44 is coplanar and collinear with the lower portion 42 where the two meet. The upper portion 44 has a thinned section 45 near the distal end 46. The thinned section near the distal end 46 provides for a very flexible tip that is suitable for rubbing in a sealing fashion against the slide out room floor 20. The upper portion 44 of the exterior leg 40 is resilient and more flexible than the lower portion 42.

Figure 3:
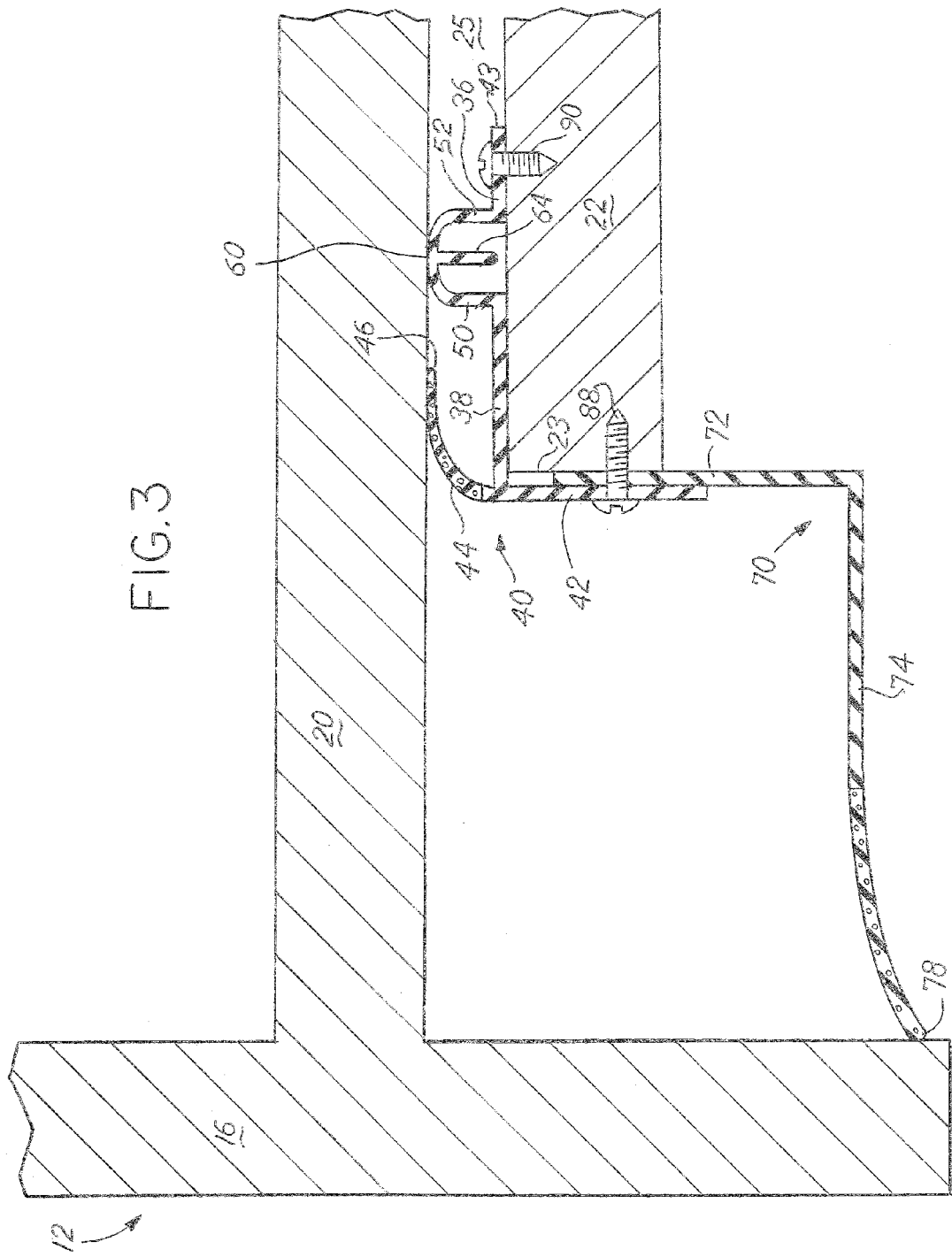
FIG. 3 is a side view of the slide out room in a retracted position over the main floor.

The inward flange 36 and outward flange 38 are separated by a wear bar 48. The wear bar has an inward upright member 50 and an outward upright member 52. The inward and outward upright members 50, 52 are perpendicular to the inward flange 36 and outward flange 38 and extend upwardly opposite the lower surfaces 37, 39. The inward and outward flanges 36, 38 are integrally joined to the upright members 50, 52 at their respective terminal ends 41, 47 so that no part of the flanges 36, 38 extend beyond the upright members 50, 52. The upright members 50, 52 terminate in an arcuate top 54 that is integrally joined to the upright members 50 and 52. The arcuate top 54 has an upper surface 56 and a lower surface 58. The lower surface 58 of the arcuate top 54 is spaced away from the lower surfaces 37, 39 of the flanges. Therefore, there is a predetermined distance D1 between the lower surface 58 of the arcuate top 54 and the plane formed by the coplanar lower surfaces 37, 39. The plane on which the coplanar lower surfaces 37, 39 rest is the main floor 22. Thus, the lower surface 58 of the arcuate top 54 is spaced from the main floor 22 by predetermined distance D1 when installed. The arcuate top 54 has a peak 60 that is evenly spaced between the upright members 50, 52. The peak 60 forms the farthest point of the wear bar 48 above the main floor 22 when installed as shown in FIG. 3. The peak 60 is the farthest location from the lower surfaces 37, 39 on the wear bar 48 and is located at the approximate midpoint of the arcuate top 54.

The wear bar 48 includes a strut 64 that extends from the lower surface 58 toward the lower surfaces 37, 39 of flanges 36, 38. FIG. 4 shows the strut 64. The strut 64 has a distal end 66 that is farthest from the lower surface 58 to which the strut 64 is attached. The distal end 66 is a predetermined distance D2 from the lower surface 58. Because the distal end 66 is nearer the lower surface of the arcuate top 58 than lower surfaces 37, 39, the strut 64 does not contact the main floor 22 when the wear bar 48 is in an undeformed condition. In other words, the strut 66 is shorter than the height of the lower surface 58 of the arcuate top 54 above the main floor 22. Under enough force, it may be possible to deform the wear bar 48 so that the strut 66 does touch the main floor 22. The strut 64 can provide some additional support for the floor 20 when it is deformed sufficiently for the strut 64 to contact the main floor 22.

In addition to a floor portion 34, the seal 10 has a splash portion 70 that is adapted for sealing against the end wall 16. The splash portion 70 is L-shaped having a mounting leg 72 and a sealing leg 74. The mounting leg 72 and approximately half of the sealing leg 74 are made of the same durometer material. The mounting leg 72 is adapted for being mounted to the outermost edge 23 of the main floor 22. The sealing leg 74 is made of a lower durometer material near its distal end 78. The portion of the sealing leg 74 nearest the distal end 78 is resilient and more flexible than the portion of the sealing leg nearest the mounting leg 72. FIG. 5 shows the differently hatched sections indicating the aforementioned portions of the sealing leg 74. The distal end 78 is adapted for flexibly sealing against the end wall 16 of the slide out room 12.

The seal 10 is installed as shown in FIG. 3. The lower surfaces 37, 39 of the inward and outward flanges 36, 38 rest upon the main floor 22. The splash portion 70 of the seal is placed so the mounting leg 72 is between the lower portion 42 of the floor portion 34 and the edge 23 of the main floor 22. As shown in FIG. 3, a single fastener 88 can extend through both the lower portion 42 and the mounting leg 72 to hold the seal 10 to the RV. The sandwiching of the mounting leg 72 allows the weight of the sealing leg 74 and any force applied to the distal end 78 to be distributed across the lower portion 42 and not directly to the fastener 88. An additional fastener 90 may be driven though the inward flange 36 into the main floor 22. The fasteners 88, 90 may be screws, nails, staples, or other suitable fasteners. In its installed position, the splash portion will seal against the end wall 16 to prevent water or other debris from entering the slide out room 12 from below.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A seal for living quarters having main living area walls and a main living area floor defining a main living area, said main living area floor having a lateral edge, an aperture in one of said main living area walls slidably receiving a slide out room having slide out room walls and a second floor defining an auxiliary living space, said slide out room capable of movement between a retracted and an extended position, said second floor partially and slidably overlaying said main living area floor and separated therefrom, said seal comprising:
    a floor portion formed from a single member, and a splash portion formed from a single member;
    the floor portion comprising: an inward flange and an outward flange, said inward flange having a lower surface and an upper surface, said outward flange having a lower surface and an upper surface, said lower surface of said outward flange being substantially coplanar with said lower surface of said inward flange, a wear bar integrally attached between said inward flange and said outward flange, said wear bar including upright members opposite each other extending from said inward and outward flanges at corresponding first terminal ends in a direction opposite said lower surfaces of said inward and outward flanges, said upright members being substantially perpendicular to said lower surfaces of said inward and outward flanges, said upright members terminating in an arcuate top having a lower surface and an upper surface, said lower surface of said arcuate top being spaced from said lower surfaces of said flanges for a first predetermined distance, a strut extending from said lower surface of said arcuate top toward said lower surfaces of said flange and being spaced from said upright members and extending for a second predetermined distance that is lesser than said first predetermined distance, an exterior leg attached at a second terminal end of said outer flange at a point intermediate to its ends and being substantially perpendicular to said outer flange, said exterior leg having a lower portion extending in an opposite direction of said wear bar below said lower surfaces of said inner and outer flanges, said exterior leg including an upper portion being located above said outer flange and substantially collinear with said lower portion where it meets said lower portion, said upper portion being more flexible than said lower portion, said exterior leg forming a generally T-shaped section with said outer flange;
    the splash portion being generally L-shaped and comprising: a mounting leg and a sealing leg that is substantially perpendicular to said mounting leg, said sealing leg having a portion nearest a distal end of said sealing leg being more flexible than said mounting leg; and
    said lower portion of said floor portion adapted to overlay a portion of said mounting leg of said splash portion, and said upper portion of said outer leg and said wear bar adapted to contact a lower surface of said second floor.

2. The seal of claim 1, further comprising a mechanical fastener driven through said lower portion of said exterior leg and said mounting leg for attaching said floor portion and said splash portion to said main living area floor.

3. The seal of claim 2, wherein said mounting leg of said splash portion is adapted to overlay and directly contact said lateral edge of said main living area floor.

4. The seal of claim 3, wherein said lower surface of said inward and outward flange is adapted to overlay and directly contact an upper surface of a portion of said main living area floor.

5. The seal of claim 1, wherein said distal end of said sealing leg is adapted to contact said end wall of said slide out room when said slide out room is in said retracted position.

6. The seal of claim 5, wherein said upper portion of said exterior leg has a thinned section at a distal end.

7. A seal for living quarters having main living area walls and a main living area floor defining a main living area, said main living area floor having a lateral edge, an aperture in one of said main living area walls slidably receiving a slide out room having slide out room walls and a second floor defining an auxiliary living space, said slide out room capable of movement between a retracted and an extended position, said second floor partially and slidably overlaying said main living area floor and separated therefrom, said seal comprising:
 a floor portion formed from a single member, and a splash portion formed from a single member;
 the floor portion comprising: an inward flange and an outward flange, said inward flange having a lower surface and an upper surface, said outward flange having a lower surface and an upper surface, said lower surface of said outward flange being substantially coplanar with said lower surface of said inward flange, a wear bar integrally attached between said inward flange and said outward flange, said wear bar including upright members opposite each other extending from said inward and outward flanges at their corresponding first terminal ends in a direction opposite said lower surfaces of said inward and outward flanges, said upright members being substantially perpendicular to said lower surfaces of said inward and outward flanges, said upright members terminating in an arcuate top having a lower surface and an upper surface, an exterior leg attached at a second terminal end of said outer flange, said exterior leg having a lower portion substantially perpendicular to said lower surfaces of said flanges and extending in an opposite direction of said wear bar, said exterior leg including an upper portion connected at said second terminal end of said outer flange and said upper portion being substantially collinear with said lower portion where they meet, said upper portion being more flexible than said lower portion, said upper portion of said outer leg and said wear bar adapted to contact a lower surface of said second floor; and
 the splash portion being generally L-shaped and comprising: a mounting leg and a sealing leg that is substantially perpendicular to said mounting leg, said sealing leg having a portion nearest a distal end of said sealing leg being more flexible than said mounting leg.

8. The seal of claim 7, wherein said lower surface of said arcuate top is spaced from said lower surfaces of said flanges for a first predetermined distance, and the floor portion further comprising a strut extending from said lower surface of said arcuate top toward said lower surfaces of said flanges for a second predetermined distance that is lesser than said first predetermined distance.

9. The seal of claim 7, wherein said lower portion of said floor portion is adapted to overlay a portion of said mounting leg of said splash portion.

10. The seal of claim 9, further comprising a mechanical fastener driven through said lower portion of said exterior leg and said mounting leg for attaching said floor portion and said splash portion to said main living area floor.

11. The seal of claim 10, wherein said mounting leg of said splash portion is adapted to overlay and directly contact said lateral edge of said main living area floor.

12. The seal of claim 11, wherein said lower surface of said inward and outward flange is adapted to overlay and directly contact an upper surface of a portion of said main living area floor.

13. The seal of claim 12, wherein said distal end of said sealing leg is adapted to contact said end wall of said slide out room when said slide out room is in said retracted position.

14. The seal of claim 13, wherein said upper portion of said exterior leg has a thinned section at a distal end.

15. A seal for living quarters having main living area walls and a main living area floor defining a main living area, said main living area floor having a lateral edge, an aperture in one of said main living area walls slidably receiving a slide out room having slide out room walls and a second floor defining an auxiliary living space, said slide out room capable of movement between a retracted and an extended position, said second floor partially and slidably overlaying said main living area floor and separated therefrom, said seal comprising:
 a floor portion formed from a single member, and a splash portion formed from a single member;
 the floor portion comprising: an inward flange and an outward flange, said inward flange having a lower surface and an upper surface, said outward flange having a lower surface and an upper surface, said lower surface of said outward flange being substantially coplanar with said lower surface of said inward flange, a wear bar integrally attached between said inward flange and said outward flange, said wear bar extending from said inward and outward flanges at their corresponding first terminal ends in a direction opposite said lower surfaces of said inward and outward flanges, said wear bar having a lower surface and an upper surface, an exterior leg attached at a second terminal end of said outer flange, said exterior leg having a lower portion substantially perpendicular to said lower surfaces of said flanges and
 extending in an opposite direction of said wear bar, said exterior leg including an upper portion connected at said second terminal end of said outer flange and said upper portion being substantially collinear with said lower portion where they meet, said upper portion being more flexible than said lower portion, said upper portion of said outer leg and said wear bar adapted to contact a lower surface of said second floor; and
 the splash portion being generally L-shaped and comprising: a mounting leg and a sealing leg that is substantially perpendicular to said mounting leg, said sealing leg having a portion nearest a distal end of said sealing leg being more flexible than said mounting leg.

16. The seal of claim 15, wherein said lower portion of said floor portion is adapted to overlay a portion of said mounting leg of said splash portion.

17. The seal of claim 15, wherein said lower surface of said wear bar is spaced from said lower surfaces of said flanges for a first predetermined distance, the floor portion further comprising a strut extending from said lower surface of said wear bar toward said lower surfaces of said flanges for a second predetermined distance that is lesser than said first predetermined distance.

18. The seal of claim 15, further comprising a mechanical fastener driven through said lower portion of said exterior leg and said mounting leg for attaching said floor portion and said splash portion to said main living area floor.

* * * * *